(12) United States Patent
Beyea

(10) Patent No.: US 10,602,733 B1
(45) Date of Patent: Mar. 31, 2020

(54) ROW CROP SPRAYER

(71) Applicant: Kyle H. Beyea, Gothenberg, NE (US)

(72) Inventor: Kyle H. Beyea, Gothenberg, NE (US)

(*) Notice: Subject to any disclaimer, the term of this patent is extended or adjusted under 35 U.S.C. 154(b) by 208 days.

(21) Appl. No.: 15/722,455

(22) Filed: Oct. 2, 2017

(51) Int. Cl.
*A01M 7/00* (2006.01)
*B62D 49/06* (2006.01)
*A01C 23/00* (2006.01)
*A01G 25/09* (2006.01)
*A01M 21/04* (2006.01)

(52) U.S. Cl.
CPC .......... *A01M 7/006* (2013.01); *A01M 7/0064* (2013.01); *A01M 21/043* (2013.01); *B62D 49/0607* (2013.01); *A01C 23/008* (2013.01); *A01G 25/09* (2013.01); *B60Y 2200/221* (2013.01)

(58) Field of Classification Search
CPC .... A01M 7/006; A01M 7/0064; A01M 7/005; A01M 7/0067; A01M 7/0014; A01M 7/0042; A01M 21/043; A01B 35/10; A01B 39/04; A01B 39/26; B05B 1/28; B05B 12/32; B05B 12/34; B05B 12/36; B60Y 2200/221; A01G 25/09; A01C 23/008; B62D 49/0607
See application file for complete search history.

(56) References Cited

U.S. PATENT DOCUMENTS

| | | | | |
|---|---|---|---|---|
| 4,353,505 A | * | 10/1982 | Kinder ................ | A01M 7/0064 239/167 |
| 4,521,988 A | * | 6/1985 | Thacker .............. | A01M 7/0064 47/1.7 |
| 4,715,449 A | * | 12/1987 | Winter ................. | A01B 39/26 172/513 |
| 4,873,788 A | * | 10/1989 | Viramontes ......... | A01M 7/0064 47/1.7 |
| 5,398,874 A | * | 3/1995 | Dailey ................ | A01C 23/047 239/175 |
| 6,076,613 A | | 6/2000 | Frasier | |
| 9,420,776 B2 | * | 8/2016 | Kline, III ........... | A01M 7/0042 |
| 2006/0257516 A1 | * | 11/2006 | Ness .................... | B28B 7/0041 425/411 |

* cited by examiner

*Primary Examiner* — Darren W Gorman
*Assistant Examiner* — Christopher R Dandridge
(74) *Attorney, Agent, or Firm* — Dennis L. Thomte; Thomte Patent Law Office LLC

(57) ABSTRACT

A row crop sprayer for use in spraying a liquid herbicide onto the ground between crop rows. The sprayer includes structure for deflecting the canopies of the crop rows to expose the ground adjacent the crop rows.

19 Claims, 6 Drawing Sheets

ROW CROP SPRAYER

BACKGROUND OF THE INVENTION

Field of the Invention

This invention relates to a row crop sprayer and more particularly to a row crop sprayer for use in spraying a herbicide to the ground between first, second and third crop rows to kill post-emergence weeds between the crop rows. Even more particularly, the row crop sprayer of this invention includes structure for deflecting the canopy of the first crop row inwardly from both sides of the first crop row to increase the exposure of the ground at both sides of the first crop row to enhance the spraying of the ground at both sides of the first crop row.

The row crop sprayer of this invention also includes structure for deflecting the canopies of the second and third crop rows outwardly to increase the exposure of the ground at the inner sides of the second crop rows to enhance the spraying of the ground at the inner sides of the second and third crop rows.

Description of the Related Art

Crops such as soybeans, dry beans, field peas, sugar beets, potatoes, lentils, etc., are planted in spaced-apart rows. The spacing of the rows may be 16", 22", 28" or 30". Usually, shortly after the crop is planted, the ground between the rows is sprayed with a herbicide to prevent the growth of weeds between the rows. However, post-emergence weeds may begin to grow between the rows. It is difficult to spray the ground between the rows since the canopies of the crop in adjacent rows have spread outwardly over the ground between the rows. The overhang of the canopies shields the ground therebelow thereby making it difficult to apply a post-emergence herbicide to the ground between the rows.

Hooded row crop sprayers have been provided in an attempt to spray a herbicide onto the ground between the crop rows. The prior art hooded row crop sprayers utilize hoods which extend over and around the crop row to shield the crop from herbicide spray. However, the hooded crop sprayers are not adjustable to fit the changing crop canopy as the crop grows.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

An agricultural row crop sprayer for applying a liquid herbicide to the ground between first, second, and third crop rows in a field as the sprayer is pulled through the field by a vehicle having a lift hitch at the rearward end thereof and having a herbicide storage tank positioned on the vehicle. The sprayer includes a lift frame having a forward end, a rearward end, a first end and a second end. The forward end of the lift frame is secured to the lift hitch of the vehicle with the lift frame extending rearwardly from the vehicle. The lift frame is moveable between raised and lowered positions by the lift hitch.

The sprayer includes an upstanding first, second, third and fourth crop shields, each of which have a lower end, an upper end, a forward end, a rearward end, an inner side and an outer side. The first and second crop shields are secured to the lift frame intermediate the first and second ends of the lift frame and are positioned below the lift frame. The first and second crop shields are selectively moveable towards one another and selectively moveable away from one another. The third crop shield is secured to the lift frame at the first end of the lift frame and is positioned below the lift frame. The third crop shield is selectively moveable towards the first crop shield and is selectively moveable away from the first crop shield. The fourth crop shield is secured to the lift frame at the second end of the lift frame and is positioned below the lift frame. The fourth crop shield is selectively moveable towards the second crop shield and is selectively moveable away from the second crop shield.

A first spray nozzle is mounted at the outer side of the first crop shield when spraying liquid herbicide downwardly onto the ground outwardly of the first crop shield and a second spray nozzle is mounted on the outer side of the second crop shield for spraying liquid herbicide downwardly onto the ground outwardly of the second crop shield. A third spray nozzle is mounted on the inner side of the third crop shield for spraying liquid herbicide onto the ground inwardly of the third crop shield. A fourth spray nozzle is mounted at the inner side of the fourth crop shield for spraying liquid herbicide onto the ground inwardly of the fourth crop shield. The first, second, third and fourth spray nozzles are fluidly connected to the herbicide storage tank.

The first and second crop shields are spaced-apart a distance which is less than the width of the canopy of the first crop row. The forward ends of the first and second crop shields engage and narrow the canopy of the first crop row as the vehicle pulls the sprayer through the field whereby the canopy of the first crop row will pass rearwardly between the first and second crop shields. The forward end of the third crop shield engages the inner side of the canopy of the second crop row as the vehicle pulls the sprayer through the field whereby the inner side of the canopy of the second crop row will be deflected outwardly and then pass rearwardly along the outer side of the third crop shield. The forward end of the fourth crop shield engages the inner side of the canopy of the third crop row as the vehicle pulls the sprayer through the field whereby the inner side of the canopy of the third crop row will be deflected outwardly and then pass rearwardly along the outer side of the fourth crop shield.

The crop shields by deflecting the canopies of the crop rows increases the exposure of the ground between the crop rows to facilitate the spraying of the ground between the crop rows.

The row crop sprayer of this invention may also be modified so as to be mounted on an elongated tool bar for spraying the ground between several crop rows.

An object of the invention is to provide an improved row crop sprayer.

A further object of the invention is to provide a row crop sprayer which includes crop shields for engaging and deflecting the canopies of the crop in crop rows to enable the sprayer to spray a herbicide closer to the crop.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
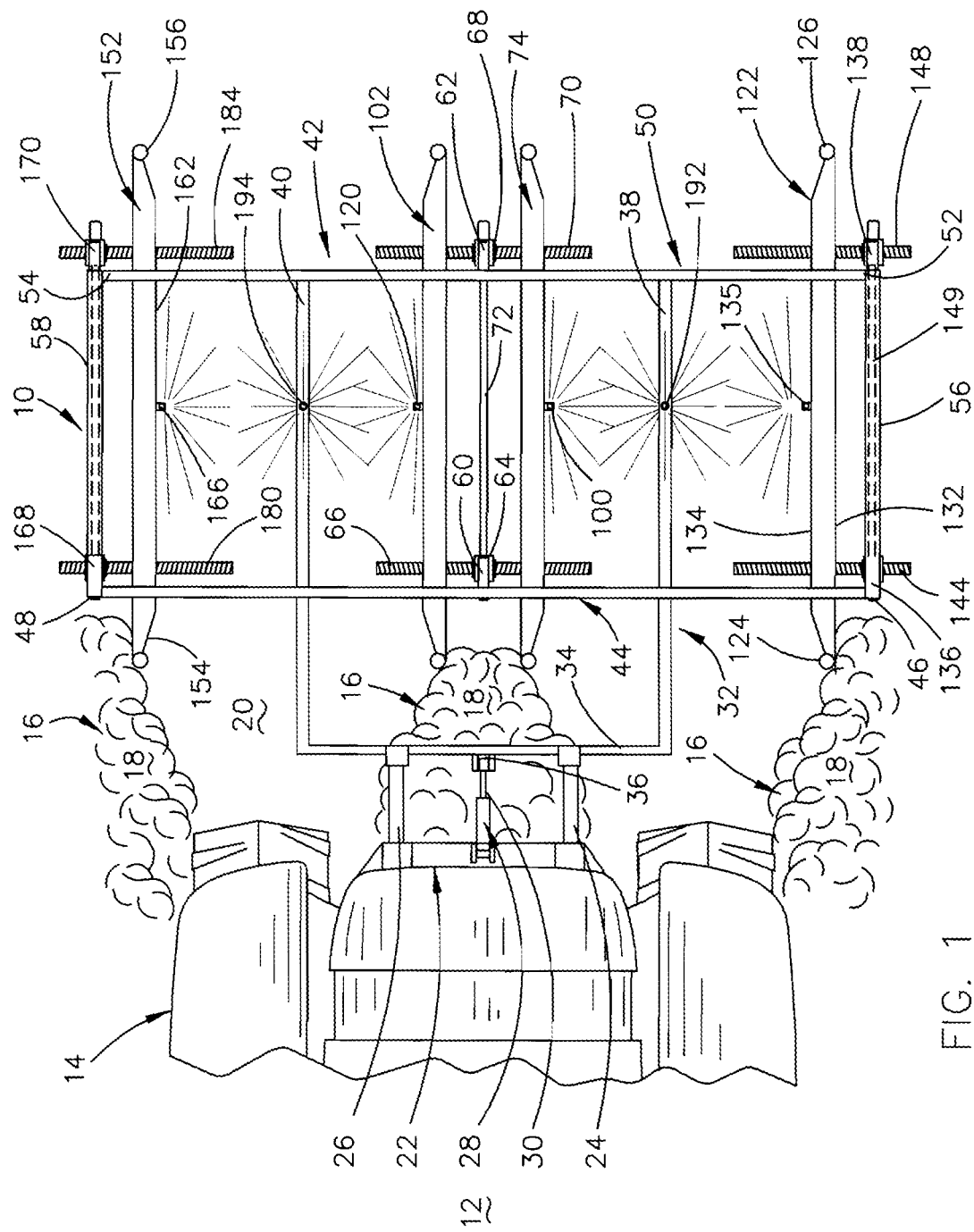
FIG. 1 is a top view of the row crop sprayer of this invention which is being pulled through a crop row field by a vehicle such as a tractor, ATV, etc.
Figure 2:
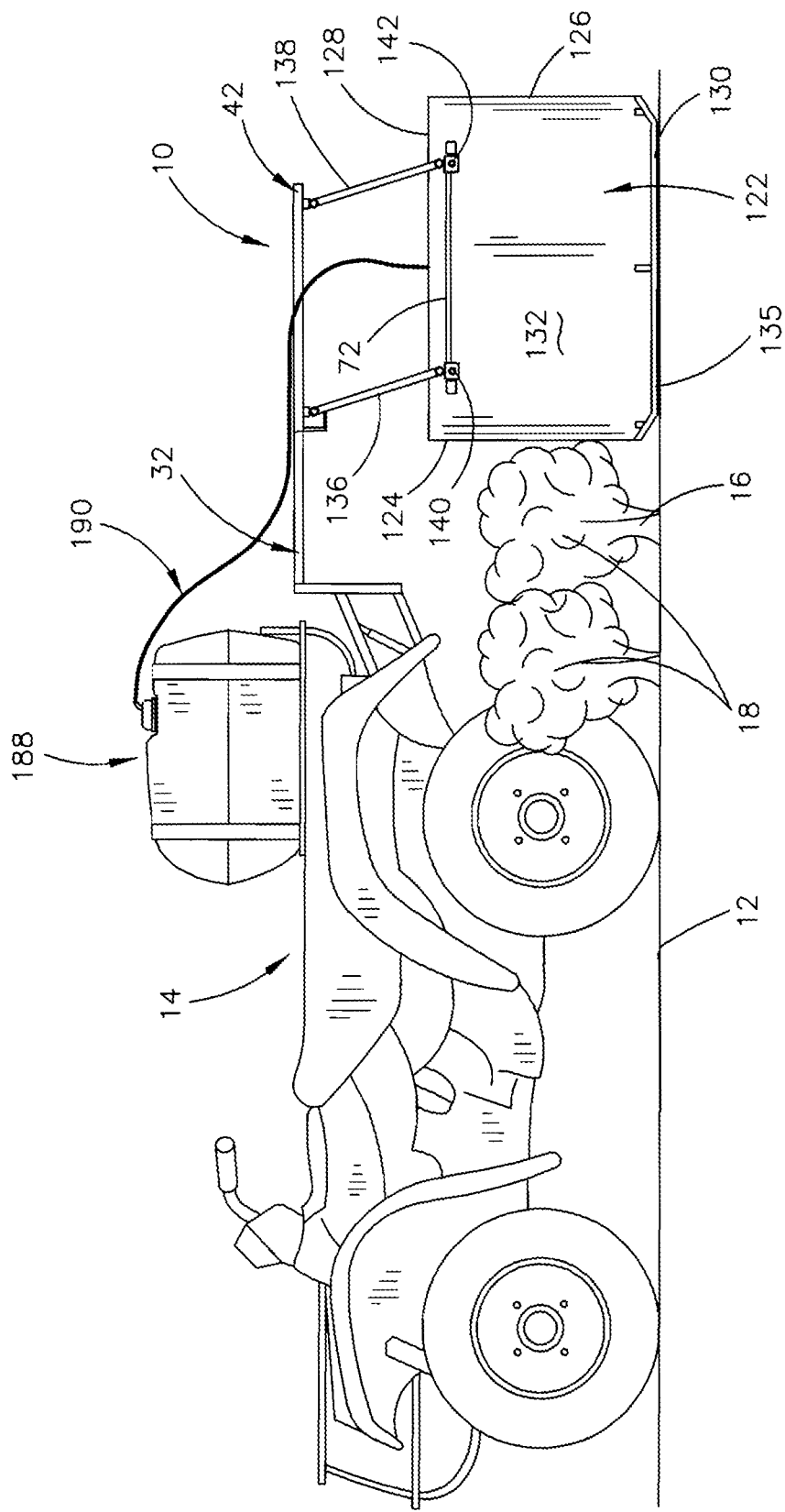
FIG. 2 is a side view of the row crop sprayer of this invention being pulled through a crop row field.
Figure 3:
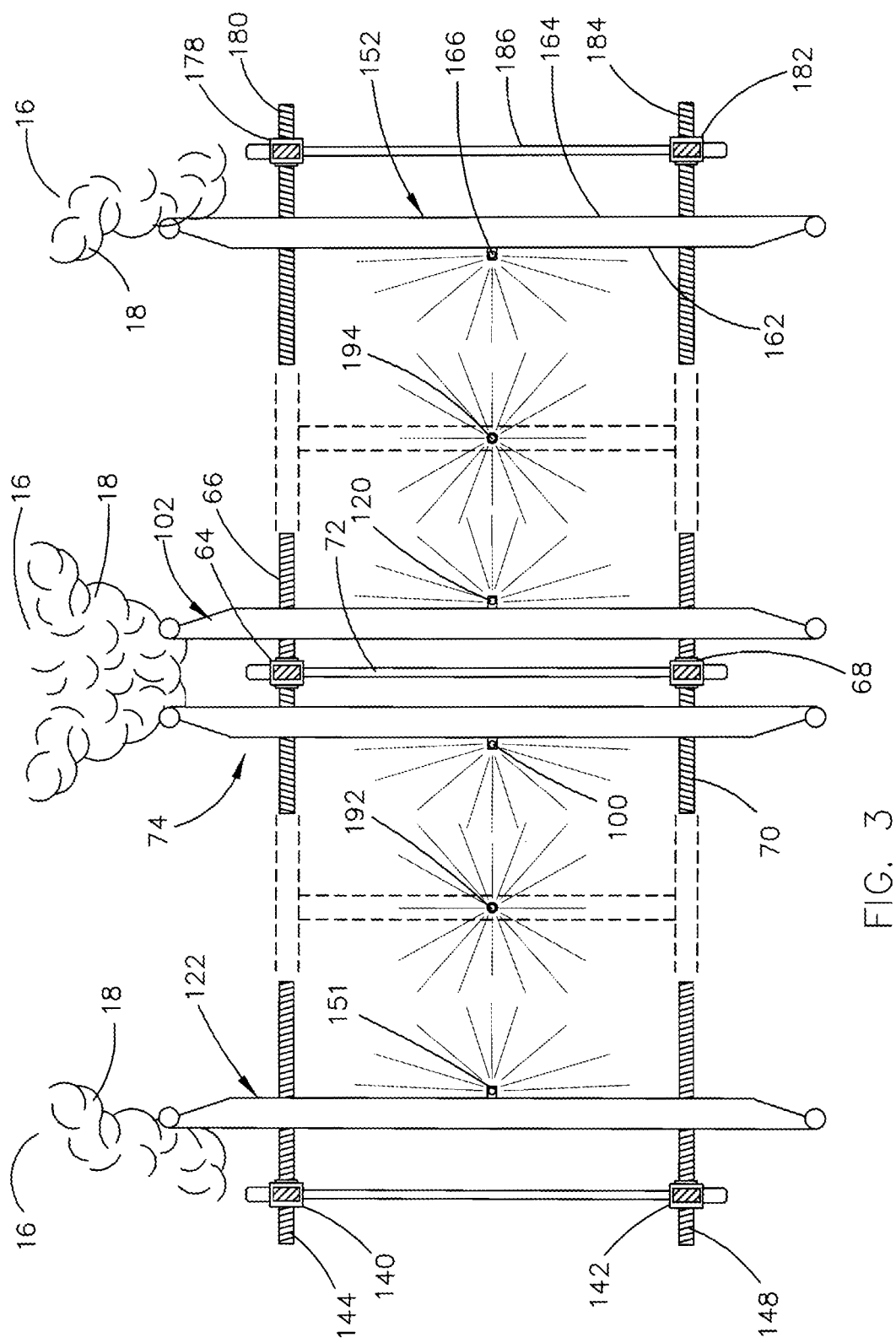
FIG. 3 is a partial view of the row crop sprayer of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The row crop sprayer of this invention is designated by the reference numeral 10. The sprayer 10 is configured to be parallel through the crop row field 12 by a vehicle such as an ATV or tractor 14. The field 12 has a plurality of crop rows 16 wherein the plants or crops therein have canopies 18 which hang over the ground 20 between the adjacent crop rows 16.

The vehicle 14 has a three-point hitch 22 of conventional design positioned at the rear of the pivotal left arms 24 and 26 which extend rearwardly from the vehicle 14. Hitch 22 includes a pair of pivotal lift arms 24 and 26 which extend rearwardly from the vehicle 14. Hitch 22 also includes a hydraulic electrical lift cylinder 28. The rearward end of the cylinder rod 30 of lift cylinder 28 is connected to the forward end of a lift frame 32. Lift frame 32 includes a transversely extending front frame member 34 to which the cylinder rod 30 of lift cylinder 28 is connected at 36. Lift frame 32 has an elongated frame member 38 extending rearwardly from one end of frame member 34. Lift frame 32 also has an elongated frame member 40 extending rearwardly from the other end thereof. Thus, when hydraulic cylinder 28 is extended, lift frame 32 will be raised. When lift cylinder 28 is retracted, lift frame 32 will be lowered.

The numeral 42 refers to a crop shield lift frame means which is secured to lift frame 32 so as to be transversely disposed with respect to lift frame 32. Crop shield lift frame means 42 includes an elongated front frame 44 member having ends 46 and 48. Crop shield lift frame means 42 also includes an elongated rear frame member 50 having ends 52 and 54. A frame member 56 is secured to ends 46 and 52 of frame members 44 and 50 respectively and extends therebetween. A frame member 58 is secured to ends 48 and 54 of frame members 44 and 50 respectively and extends therebetween.

A pair of elongated parallel arms 60 and 62 have their upper ends pivotally secured to frame members 44 and 50 respectively and extend downwardly and rearwardly therefrom. An electrically driven Acme screw motor 64 is pivotally secured to the lower end of arm 60 and has a rotatable twin lead screw 66 extending therethrough with the threads thereof on opposite sides of the motor being on opposite sides of the motor being opposite. An electrically driven Acme screw motor 68 is pivotally secured to the lower end of arm 62 and has a rotatable twin lead screw 70 extending therethrough and therefrom. A stabilizer rod or shaft 72 is secured to the motors 64 and 68 and extends therebetween.

Figure 4:
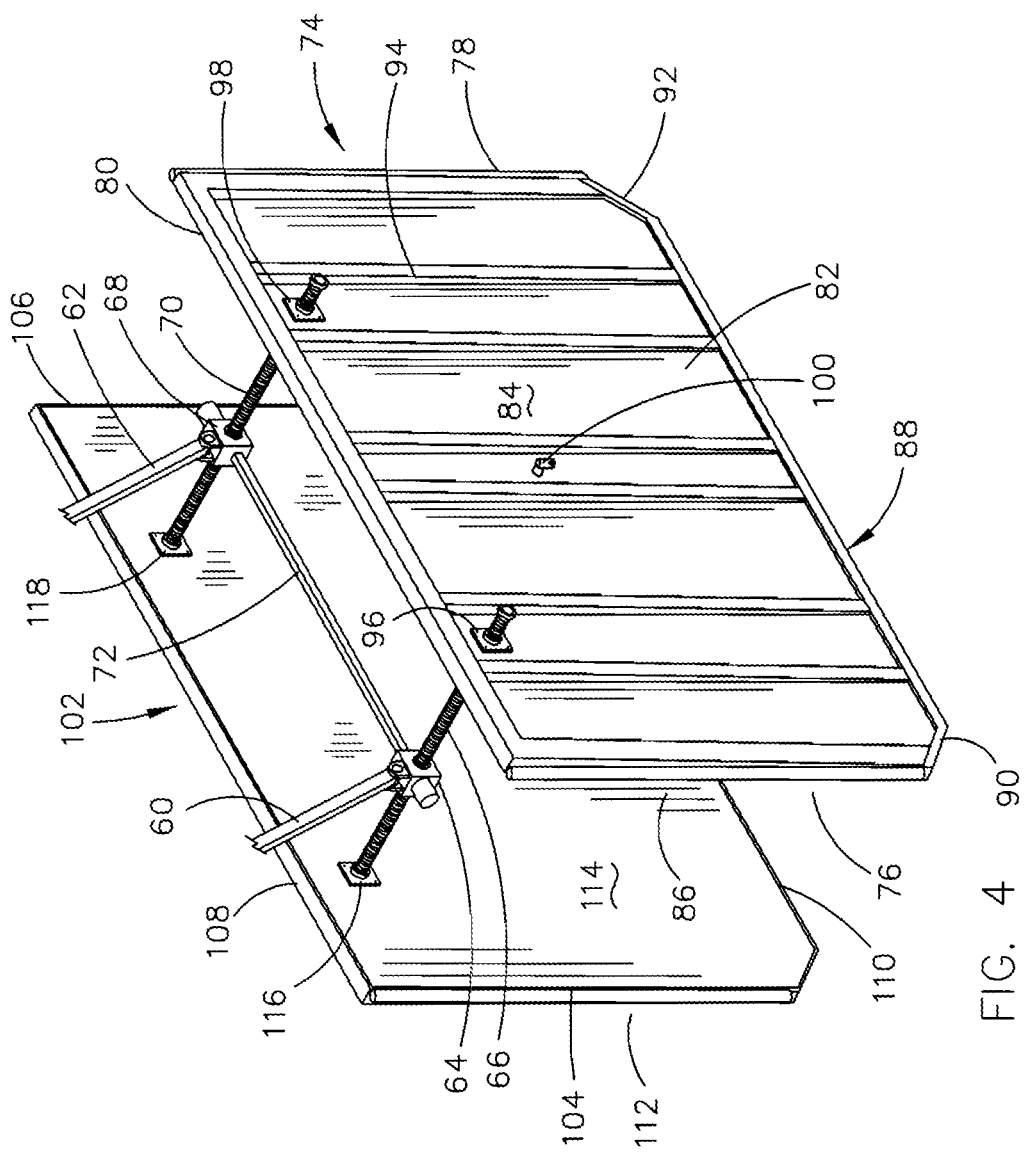
FIG. 4 is a partial perspective view of the row crop sprayer of this invention.
Figure 5:
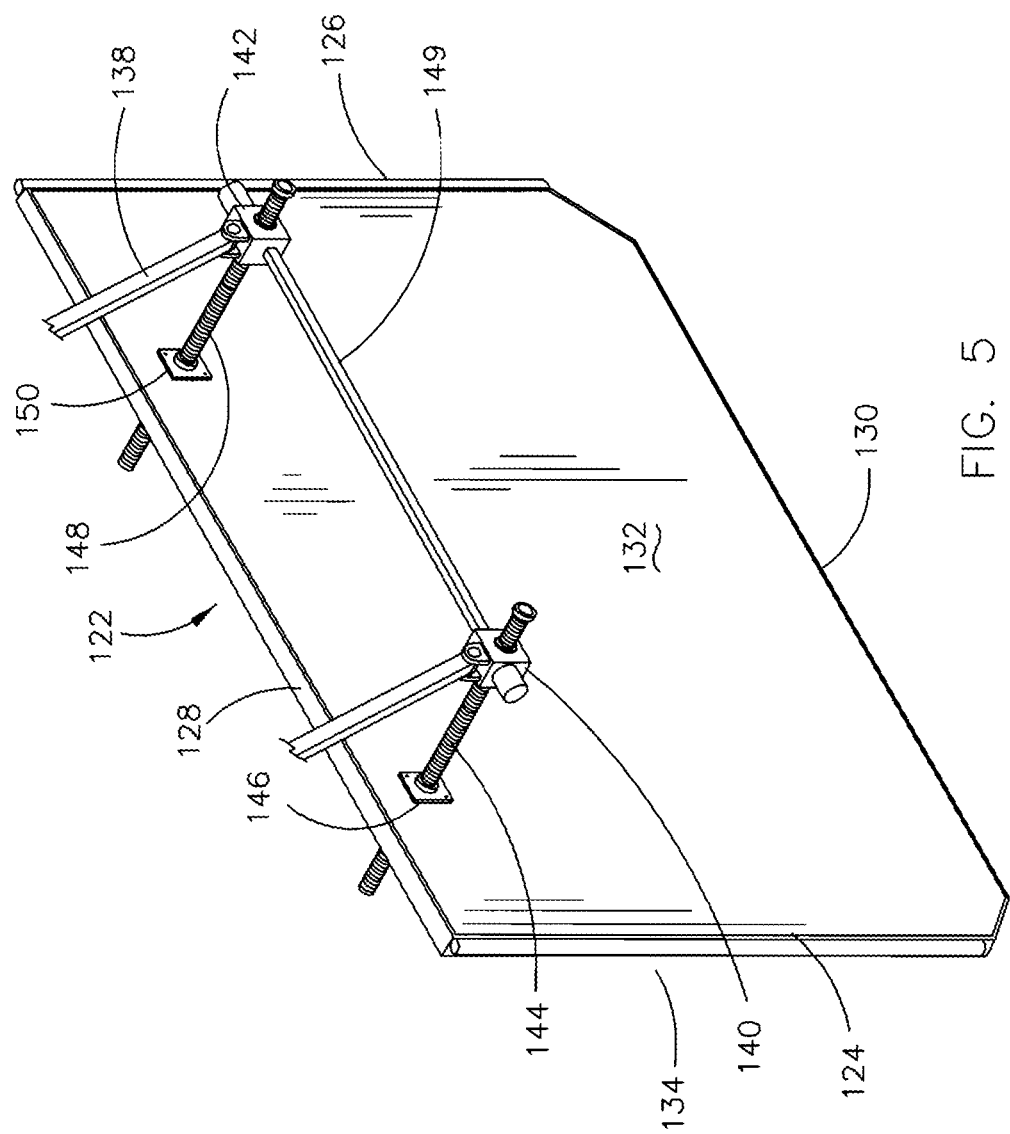
FIG. 5 is a partial perspective view of the row crop sprayer of this invention.

The numeral 74 refers to a first upstanding crop shield having a forward end 76, a rearward end 78, an upper end 80, a lower end 82, an outer side 84 and an inner side 86. The lower end 82 of crop shield 74 has a skid member 88 therein which has an upwardly tapered or beveled portion 90 at its forward end and a tapered or beveled portion 92 at its rearward end. The outer side 84 of crop shield 74 has stiffening member 94 thereon. Crop shield 74 has a pair of Acme adjustment drive members 96 and 98 positioned therein at its upper end 80 as seen in FIG. 4. The Acme adjustment drive members 96 and 98 threadably receive one end of the twin lead screws 66 and 70 respectively. When the screws 66 and 70 are rotated in a first direction by the motors 64 and 68 respectively, the crop shield 74 will be moved inwardly. When the screws 66 and 70 are rotated in a second direction by the motors 64 and 68 respectively, the crop shield 74 will be moved outwardly.

Crop shield 74 has a spray nozzle 100 at its outer side which is designed to spray liquid herbicide downwardly and outwardly onto the grout at one side of the crop row.

The numeral 102 refers to a second upstanding crop shield having a forward end 104, a rearward end 106, an upper end 108, a lower end 110, an outer side 112 and an inner side 114. The inner side 114 of crop shield 102 has a pair of Acme adjustable drive members 116 and 118 mounted thereon which receive the ends of the two lead screws 66 and 70 respectively. Thus, when the motors 64 and 68 rotate the screws 66 and 70 in one direction, crop shields 74 and 102 will be moved towards one another. When the motors 64 and 68 rotate the screws 66 and 70 in an opposite direction, the crop shields 74 and 102 will be moved away from one another. Crop shield 102 has a spray nozzle 120 at its outer side.

The numeral 122 refers to a third upstanding crop shield having a forward end 124, a rearward end 126, an upper end 128, a lower end 130, an outer side 132 and an inner side 134. A spray nozzle 135 is positioned at the inner side 134 of crop shield 122. A pair of parallel arms 136 and 138 have their upper ends pivotally secured to frame members 44 and 50 and extend downwardly and rearwardly therefrom.

An Acme screw motor 140 is pivotally secured to the lower end of arm 136 and an Acme screw motor 142 is pivotally secured to the lower end of arm 138. Motor 140 has a threaded and rotatable screw 144 extending therethrough and therefrom. Screw 144 extends through an Acme adjustable drive member 146 which is mounted on crop shield 122. Motor 142 has a threaded and rotatable screw 148 extending therethrough and therefrom. Screw 148 extends through an Acme adjustable drive member 150 which is mounted on crop shield 122. When the motors 140 and 142 rotate the screws 144 and 148 in a first direction, the crop shield 122 will be moved outwardly. When the motors 140 and 142 rotate the screws 144 and 148 in an opposite direction, the crop shield 122 will be moved inwardly.

The numeral 152 refers to an upstanding fourth crop shield having a forward end 154, a rearward end 156, an upper end 158, a lower end 160, an inner side 162 and an outer side 164. Crop shield 152 has a spray nozzle 166 at its inner side 162.

Figure 6:
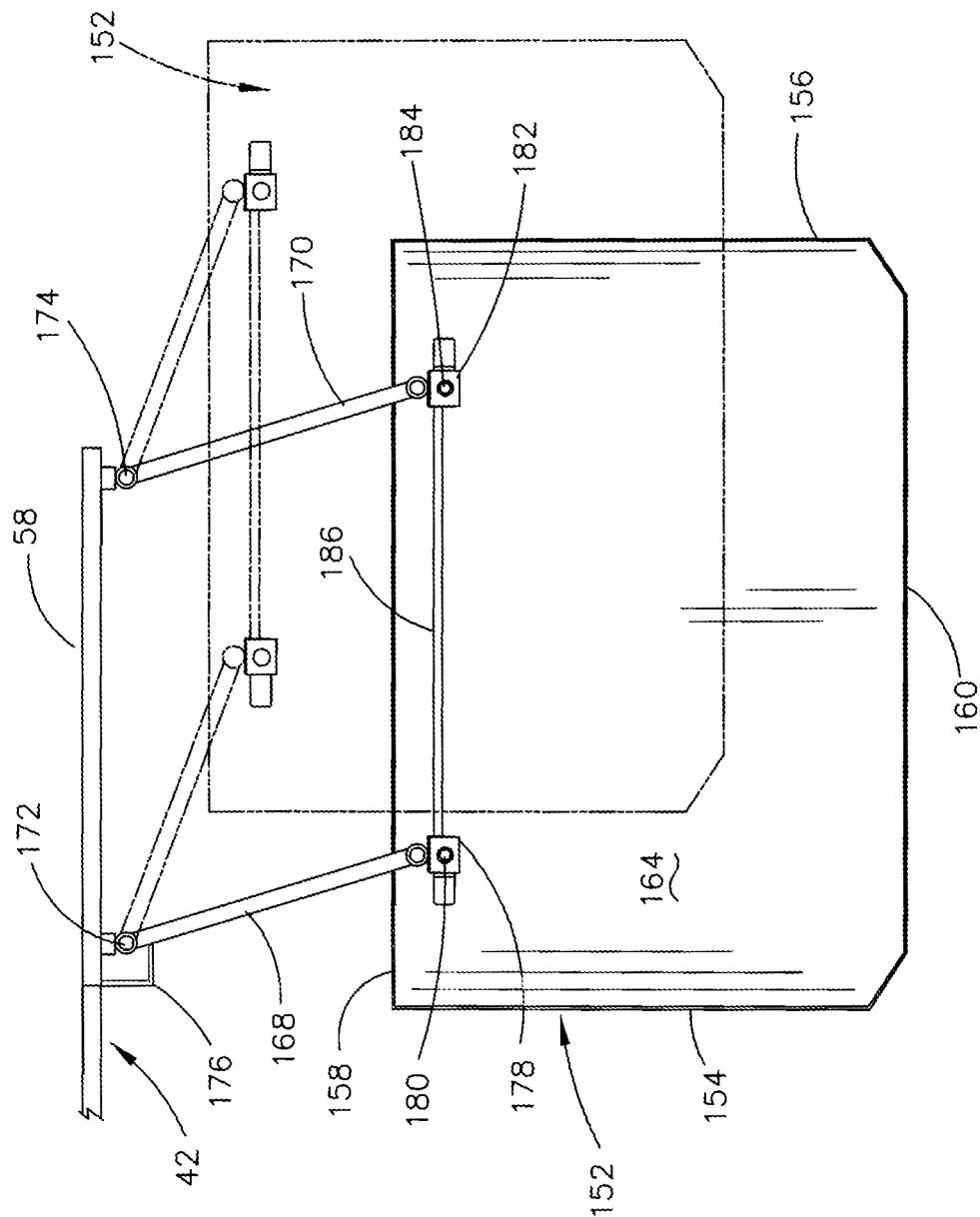
FIG. 6 is a partial side view of one of the crop shields of the row crop sprayer of this invention with the broken lines illustrating the crop shield being in an elevated position.

A pair of parallel arms 168 and 170 have their upper ends pivotally secured to frame member 58 at 172 and 174 respectively and extend downwardly and rearwardly therefrom. A stop 176 limits the forward pivotal movement of arm 168 as seen in FIG. 6. An Acme screw motor 178 is secured to the lower end of arm 168 and has a screw 180 rotatably extending therethrough. The inner end of screw 180 extends through an Acme adjustable drive member on crop shield 152. An Acme screw motor 182 is secured to the lower end of arm 170 and has a screw 184 rotatably extending therethrough. The inner end of screw 184 extends through an Acme adjustable drive member on crop shield 152. A rod or shaft 186 is secured to motors 178 and 182 and extends therebetween.

The numeral 188 refers to a liquid storage tank which includes a conventional pump having a liquid discharge hose assembly 190 extending therefrom. Hose assembly 190 is fluidly connected to the spray nozzles 100, 120, 151 and 166. Hose drop lines extend downwardly to spray nozzles 192 and 194.

The row crop sprayer 10 of this invention as will now be described. The forward end of the lift frame 32 is secured to the 3-point hitch 22 of the vehicle 14. The vehicle 14 may be an ATV, tractor or a self-propelled vehicle. The hitch 22 of the vehicle will normally be in its raised travel position until the spraying operation begins. When the lift frame 32 is in an elevated position, the lower ends of the crop shields 74, 102, 122 and 152 will be positioned above the ground to enable the sprayer 10 to be moved from one location to another.

The vehicle 14 will then be positioned with respect to the crop rows 16 so sprayer 10 will be positioned with respect to one end of the three crop row 16 having canopies 18. The vehicle 14 will be moved so that the crop shields 74 and 102 will be aligned with a crop row 16 as seen in FIG. 1. When the sprayer 10 is so positioned, the crop shield 122 will be aligned with a second crop row 16 and the crop shield 152 will be aligned with a third crop row 16 as seen in FIG. 1.

The crop shields 74 and 102 are moveable towards one another or moved away from one another, from the vehicle 14, to compensate for the width of the canopy of that crop row by actuating the screw motors 64 and 68 which causes lateral movement of the crop shields 74 and 102 by way of the two lead screws 66 and 70.

The position of the crop shield 122 is laterally adjusted by the screw motors 140 and 142 by way of the screws 144 and 148 so that the forward end of crop shield 122 is positioned with respect to the canopy 18 of the crop row 16 as seen in FIG. 1. The position of the crop shield 152 is laterally adjusted by the screw motors 178 and 182 so that the forward end of the crop shield 152 is positioned with respect to the canopy 18 of crop row 16 as seen in FIG. 1.

The vehicle is then moved forwardly so that the canopy of the crop row 16 associated with crop shields 74 and 102 is deflected inwardly as the sprayer 10 moves through the field. The inward deflection of the canopy of the crop row associated with the crop shields 74 and 102 exposes more of the ground at either side of that crop row so that the spray nozzles 100, 120, 192 and 194 may spray the herbicide onto the ground closer to the sides of the crop of the crop row 16.

As the vehicle 14 moves through the field, the crop shields 122 and 152 inwardly deflect the canopies of the associated crop rows 16 to expose the ground at the inner sides thereof so that the spray nozzles 135, 166, 192 and 194 may spray the herbicide onto the exposed ground.

Although the drawings illustrate that the sprayer 10 may be used with three crop rows, the components of the sprayer 10 could be used on an elongated tool bar to spray additional crop rows.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. An agricultural row crop sprayer for applying a liquid herbicide to the ground between first, second and third crop rows in a field as the sprayer is moved through the field by a vehicle having a lift hitch at the rearward end thereof and having a liquid herbicide storage tank positioned on the vehicle, comprising:

a lift frame means having a forward end, a rearward end, a first end and a second end;

said forward end of said lift frame means being secured to the lift hitch of the vehicle with said lift frame means extending rearwardly from the vehicle;

said lift frame means being movable between raised and lowered positions by the lift hitch;

an upstanding and straight first crop shield having a lower end, an upper end, a forward end, a rearward end, an inner side and an outer side;

an upstanding and straight second crop shield having a lower end, an upper end, a forward end, a rearward end, an inner side and an outer side;

an upstanding and straight third crop shield having a lower end, an upper end, a forward end, a rearward end, an inner side and an outer side;

an upstanding and straight fourth crop shield having a lower end, an upper end, a forward end, a rearward end, an inner side and an outer side;

said first and second crop shields being secured to said lift frame means intermediate said first and second ends of said lift frame means and positioned below said lift frame means;

said first and second crop shields being selectively moveable towards one another and being selectively moveable away from one another while the sprayer is moved through the field;

said third crop shield being secured to said lift frame means at said first end of said lift frame means and being positioned below said lift frame means;

said third crop shield being selectively movable towards said first crop shield and being selectively movable away from said first crop shield while the sprayer is moved through the field;

said fourth crop shield being secured to said lift frame means at said second end of said lift frame means and being positioned below said lift frame means;

said fourth crop shield being selectively movable towards said second crop shield and being selectively movable away from said second crop shield while the sprayer is moved through the field;

a first spray nozzle mounted at said outer side of said first crop shield for spraying liquid herbicide downwardly onto the ground outwardly of said first crop shield;

a second spray nozzle mounted at said outer side of said second crop shield for spraying liquid herbicide downwardly onto the ground outwardly of said second crop shield;

a third spray nozzle mounted at said inner side of said third crop shield for spraying liquid herbicide onto the ground inwardly of said third crop shield;

a fourth spray nozzle mounted at said inner side of said fourth crop shield for spraying liquid herbicide onto the ground inwardly of said fourth crop shield;

said first, second, third and fourth spray nozzles being fluidly connected to said herbicide storage tank;

said first and second crop shields being spaced-apart a distance which is less than the width of the canopy of the first crop row;

said forward ends of said first and second crop shields engaging and narrowing the canopy of the first crop row as the vehicle moves the sprayer through the field whereby the canopy of the first crop row will pass rearwardly between said first and second crop shields; and said forward end of said third crop shield engaging the inner side of the canopy of the second crop row as the vehicle moves the sprayer through the field whereby the inner side of the canopy of the second crop row will be deflected outwardly and then passed rearwardly along said outer side of said third crop shield; and said forward end of said fourth crop shield engaging the inner side of the canopy of the third crop row as the vehicle moves the sprayer through the field whereby the inner side of the canopy of the third crop row will be deflected outwardly and then passed rearwardly along said outer side of said fourth crop shield.

2. The agricultural row crop sprayer of claim 1 wherein said first and second crop shields are connected to said lift frame means by first and second parallel arms, having upper and lower ends, with said upper ends of said first and second parallel arms being pivotally secured to said lift frame means and said lower ends of said first and second parallel arms being operatively secured to said first and second crop shields and wherein each of said third and fourth crop shields are connected to said lift frame means by first and second parallel arms, having upper and lower ends, with the said upper ends thereof being pivotally secured to said lift frame means and said lower ends thereof being operatively secured to the respective crop shield.

3. The agricultural row crop sprayer of claim 2 wherein the inward and outward movement of said first and second crop shields is remotely controllable from the vehicle and wherein the inward and outward movement of said third and fourth crop shields is remotely controllable from the vehicle.

4. The agricultural row crop sprayer of claim 2 wherein said first and second crop shields are selectively moveable towards one another and selectively moveable away from one another by a first Acme screw motor assembly secured to said lower end of said first parallel arm and a second Acme screw motor assembly secured to said lower end of said second parallel arm with said first Acme screw motor having a rotatable screw which is connected to said first and second crop shields so as to extend therebetween, and with said second Acme screw motor having a rotatable screw which is connected to said first and second crop shields so as to extend therebetween.

5. The agricultural row crop sprayer of claim 1 wherein first and second parallel arms, having upper and lower ends, have their upper ends pivotally secured to said lift frame means and wherein said lower ends of said first and second parallel arms are pivotally secured to said third crop shield which is selectively moved with respect to said first crop shield by a first Acme screw motor assembly secured to said lower end of said first parallel arm with said first Acme screw motor having a rotatable screw which is connected to said third crop shield and wherein a second Acme screw motor is secured to said lower end of said second parallel arm with said second Acme screw motor having a rotatable screw which is connected to said third crop shield.

6. The agricultural row crop sprayer of claim 1 wherein first and second parallel arms, having upper and lower ends, have their upper arms pivotally secured to said lift frame means and wherein said lower ends of said first and second parallel arms are pivotally secured to said fourth crop shield which is selectively moveable with respect to said second crop shield by a first Acme screw motor which is secured to said lower end of said first parallel arm with said first Acme screw motor having a rotatable screw which is connected to said fourth crop shield and a second Acme screw motor which is secured to said lower end of said second parallel arm with said second Acme screw motor having a rotatable screw which is connected to said fourth crop shield.

7. The agricultural row crop sprayer of claim 1 wherein a fifth spray nozzle is positioned between said first and third crop shields for spraying liquid herbicide onto the ground between said first and third crop shields and wherein a sixth spray nozzle is positioned between said second and fourth crop shields for spraying liquid herbicide onto the ground between said second and fourth crop shields and wherein said fifth and sixth spray nozzles are fluidly connected to said herbicide storage tank.

8. The agricultural row crop sprayer of claim 1 wherein each of said first, second, third and fourth crop shields have a skid plate secured to said lower ends thereof.

9. An agricultural row crop sprayer for applying a liquid herbicide to the ground between first, second and third crop rows in a field as the sprayer is moved through the field by a vehicle having a lift hitch at the rearward end thereof and having a liquid herbicide storage tank positioned on the vehicle, comprising:

a lift frame means including:
(a) an elongated and transversely extending front frame member having a first end and a second end;
(b) said front frame member being horizontally disposed;
(c) an elongated first frame member, having a forward end and a rearward end, extending rearwardly from said first end of said front frame member; and
(d) an elongated second frame member, having a forward end and rearward end, extending rearwardly from said second end of said front frame member;

said front frame member of said lift frame means being secured to the lift hitch of the vehicle with said lift frame means extending rearwardly from the vehicle;

said lift frame means being movable between raised and lowered positions by the lift hitch;

a crop shield lift frame means including:
(a) an elongated and transversely extending front frame member having a first end and a second end;
(b) said front frame member being horizontally disposed;
(c) an elongated and transversely extending rear frame member having a first end and a second end;

(d) said rear frame member positioned rearwardly of said front frame member thereof;

(e) an elongated first side frame member secured to said first ends of said front and rear frame member thereof and extending therebetween;

(f) an elongated second side frame member secured to said second ends of said first and rear frame members thereof and extending therebetween;

(g) said crop shield lift frame means secured to said lift frame means for movement therewith;

(h) said first side frame member of said crop shield lift means being positioned outwardly of said first frame member of said lift frame means;

(i) said second side frame member of said crop shield lift means being positioned outwardly of said second frame member of said lift frame means;

an upstanding and straight first crop shield having a lower end, an upper end, a forward end, a rearward end, an inner side and an outer side;

said inner side and said outer side of said first crop shield being parallel to one another;

an upstanding and straight second crop shield having a lower end, an upper end, a forward end, a rearward end, an inner side and an outer side;

said inner side and said outer side of said second crop shield being parallel to one another;

an upstanding and straight third crop shield having a lower end, an upper end, a forward end, a rearward end, an inner side and an outer side;

said inner side and said outer side of said third crop shield being parallel to one another;

an upstanding and straight fourth crop shield having a lower end, an upper end, a forward end, a rearward end, an inner side and an outer side;

said inner side and said outer side of said fourth crop shield being parallel to one another;

said first and second crop shields being secured to said front and rear frame members of said crop shield lift frame means intermediate the lengths thereof and being positioned below said crop shield lift frame means;

said third crop shield being secured to said front and rear frame members of said crop shield lift frame means at said first ends thereof and being positioned below said crop shield lift frame means;

said fourth crop shield being secured to said frame and rear frame member of said crop shield lift frame means at said second ends thereof and being positioned below said crop shield lift frame means;

said first and second crop shields being selectively moveable towards one another and being selectively moveable away from one another while the sprayer is moved through the field;

said third crop shield being selectively movable towards said first crop shield and being selectively movable away from said first crop shield while the sprayer is moved through the field;

said fourth crop shield being selectively movable towards said second crop shield and being selectively movable away from said second crop shield while the sprayer is moved through the field;

a first spray nozzle mounted at said outer side of said first crop shield for spraying liquid herbicide downwardly onto the ground outwardly of said first crop shield;

a second spray nozzle mounted at said outer side of said second crop shield for spraying liquid herbicide downwardly onto the ground outwardly of said second crop shield;

a third spray nozzle mounted at said inner side of said third crop shield for spraying liquid herbicide onto the ground inwardly of said third crop shield;

a fourth spray nozzle mounted at said inner side of said fourth crop shield for spraying liquid herbicide onto the ground inwardly of said fourth crop shield;

said first, second, third and fourth spray nozzles being fluidly connected to said herbicide storage tank;

said first and second crop shields being spaced-apart a distance which is less than the width of the canopy of the first crop row;

said forward ends of said first and second crop shields engaging and narrowing the canopy of the first crop row as the vehicle moves the sprayer through the field whereby the canopy of the first crop row will pass rearwardly between said first and second crop shields;

said forward end of said third crop shield engaging the inner side of the canopy of the second crop row as the vehicle moves the sprayer through the field whereby the inner side of the canopy of the second crop row will be deflected outwardly and then passed rearwardly along said outer side of said third crop shield; and said forward end of said fourth crop shield engaging the inner side of the canopy of the third crop row as the vehicle moves the sprayer through the field whereby the inner side of the canopy of the third crop row will be deflected outwardly and then passed rearwardly along said outer side of said fourth crop shield.

10. The agricultural row crop sprayer of claim 9 wherein a fifth spray nozzle is mounted on said first side frame member of said lift frame means for spraying liquid herbicide onto the ground between said first and third crop shields and wherein a sixth spray nozzle is mounted on said second frame member of said lift frame means for spraying liquid herbicide onto the ground between said second and fourth crop shields.

11. The agricultural row crop sprayer of claim 10 wherein said fifth and sixth spray nozzles are mounted on said first and second frame members of said lift frame means between said front frame member and said rear frame member of said crop shield lift frame means.

12. The agricultural row crop sprayer of claim 9 wherein each of said first, second, third and fourth crop shields have a horizontally disposed upper end and a horizontally disposed lower end.

13. The agricultural row crop sprayer of claim 9 wherein only said lower ends of said first, second, third and fourth crop shields engage the ground so that the ground between said lower ends of said first and third shields is fully exposed and so that the ground between said second and fourth crop shields is fully exposed.

14. An agricultural row crop sprayer for applying a liquid herbicide to the ground between first, second and third crop rows in a field as the sprayer is moved through the field by a vehicle having a selectively vertically movable lift hitch at the rearward end thereof with the lift hitch including a lift cylinder which is controlled from the vehicle as the vehicle moves through the field and having a liquid storage tank positioned on the vehicle, comprising:

a lift frame means having a forward end, a rearward end, a first end and a second end;

said forward end of said lift frame means being secured to the lift hitch of the vehicle with said lift frame means extending rearwardly from the vehicle;

said lift frame means being movable between raised and lowered positions by the lift hitch;

an upstanding first crop shield having a lower end, an upper end, a forward end, a rearward end, an inner side and an outer side;

an upstanding second crop shield having a lower end, an upper end, a forward end, a rearward end, an inner side and an outer side;

an upstanding third crop shield having a lower end, an upper end, a forward end, a rearward end, an inner side and an outer side;

an upstanding fourth crop shield having a lower end, an upper end, a forward end, a rearward end, an inner side and an outer side;

said first and second crop shields being secured to said lift frame means intermediate said first and second ends of said lift frame means and positioned below said lift frame means;

said first and second crop shields being selectively moveable towards one another and being selectively moveable away from one another;

the movement of said first and second crop shields being controlled from the vehicle as the sprayer moves through the field;

said third crop shield being secured to said lift frame means at said first end of said lift frame means and being positioned below said lift frame means;

said third crop shield being selectively movable towards said first crop shield and being selectively movable away from said first crop shield;

the movement of said third crop shield being controlled from the vehicle as the sprayer moves through the field;

said fourth crop shield being secured to said lift frame means at said second end of said lift frame means and being positioned below said lift frame means;

said fourth crop shield being selectively movable towards said second crop shield and being selectively movable away from said second crop shield;

the movement of said fourth crop shield being controlled from the vehicle as the sprayer moves through the field;

a first spray nozzle mounted at said outer side of said first crop shield for spraying liquid herbicide downwardly onto the ground outwardly of said first crop shield;

a second spray nozzle mounted at said outer side of said second crop shield for spraying liquid herbicide downwardly onto the ground outwardly of said second crop shield;

a third spray nozzle mounted at said inner side of said third crop shield for spraying liquid herbicide onto the ground inwardly of said third crop shield;

a fourth spray nozzle mounted at said inner side of said fourth crop shield for spraying liquid herbicide onto the ground inwardly of said fourth crop shield;

said first, second, third and fourth spray nozzles being fluidly connected to said herbicide storage tank;

said first and second crop shields being spaced-apart a distance which is less than the width of the canopy of the first crop row;

said forward ends of said first and second crop shields engaging and narrowing the canopy of the first crop row as the vehicle moves the sprayer through the field whereby the canopy of the first crop row will pass rearwardly between said first and second crop shields;

said forward end of said third crop shield engaging the inner side of the canopy of the second crop row as the vehicle moves the sprayer through the field whereby the inner side of the canopy of the second crop row will be deflected outwardly and then passed rearwardly along said outer side of said third crop shield; and said forward end of said fourth crop shield engaging the inner side of the canopy of the third crop row as the vehicle moves the sprayer through the field whereby the inner side of the canopy of the third crop row will be deflected outwardly and then passed rearwardly along said outer side of said fourth crop shield.

15. The agricultural row crop sprayer of claim 14 wherein said first and second crop shields are connected to said lift frame means by first and second parallel arms, having upper and lower ends, with said upper ends of said first and second parallel arms being pivotally secured to said lift frame means and said lower ends of said first and second parallel arms being operatively secured to said first and second crop shields and wherein each of said third and fourth crop shields are connected to said lift frame means by first and second parallel arms, having upper and lower ends, with the said upper ends thereof being pivotally secured to said lift frame means and said lower ends thereof being operatively secured to the respective crop shield.

16. The agricultural row crop sprayer of claim 14 wherein said first and second crop shields are selectively moveable towards one another and selectively moveable away from one another by a first Acme screw motor assembly secured to said lower end of said first parallel arm and a second Acme screw motor assembly secured to said lower end of said second parallel arm with said first Acme screw motor having a rotatable screw which is connected to said first and second crop shields so as to extend therebetween, and with said second Acme screw motor having a rotatable screw which is connected to said first and second crop shields so as to extend therebetween.

17. The agricultural row crop sprayer of claim 9 wherein first and second parallel arms, having upper and lower ends, have their upper ends pivotally secured to said lift frame means and wherein said lower ends of said first and second parallel arms are pivotally secured to said third crop shield which is selectively moved with respect to said first crop shield by a first Acme screw motor assembly secured to said lower end of said first parallel arm with said first Acme screw motor having a rotatable screw which is connected to said third crop shield and wherein a second Acme screw motor is secured to said lower end of said second parallel arm with said second Acme screw motor having a rotatable screw which is connected to said third crop shield.

18. The agricultural row crop sprayer of claim 14 wherein first and second parallel arms, having upper and lower ends, have their upper arms pivotally secured to said lift frame means and wherein said lower ends of said first and second parallel arms are pivotally secured to said fourth crop shield which is selectively moveable with respect to said second crop shield by a first Acme screw motor which is secured to said lower end of said first parallel arm with said first Acme screw motor having a rotatable screw which is connected to said fourth crop shield and a second Acme screw motor which is secured to said lower end of said second parallel arm with said second Acme screw motor having a rotatable screw which is connected to said fourth crop shield.

19. The agricultural row crop sprayer of claim 14 wherein a fifth spray nozzle is positioned between said first and third crop shields for spraying liquid herbicide onto the ground between said first and third crop shields and wherein a sixth spray nozzle is positioned between said second and fourth crop shields for spraying liquid herbicide onto the ground between said second and fourth crop shields and wherein said fifth and sixth spray nozzles are fluidly connected to said herbicide storage tank.

* * * * *